United States Patent [19]

Johnson et al.

[11] Patent Number: 4,545,714
[45] Date of Patent: Oct. 8, 1985

[54] APPARATUS AND METHOD FOR FORMING STACKS OF NESTED CONTAINERS EACH HAVING A PREDETERMINED COUNT OF CONTAINERS

[75] Inventors: David E. Johnson; Donald W. Myers, both of Canandaigua, N.Y.

[73] Assignee: Mobil Oil Corporation, New York, N.Y.

[21] Appl. No.: 474,629

[22] Filed: Mar. 11, 1983

[51] Int. Cl.[4] .............................................. B65G 57/03
[52] U.S. Cl. ........................................ 414/30; 414/32; 414/109; 414/786; 406/82; 198/425
[58] Field of Search ................... 414/30, 32, 37, 104, 414/105, 109, 114, 115, 786; 198/425, 462; 406/79, 82, 19, 77, 83, 108

[56] References Cited

U.S. PATENT DOCUMENTS

| 1,424,647 | 8/1922 | Israel | 414/30 |
| 1,620,058 | 3/1927 | Bell et al. | 414/30 |
| 2,347,391 | 4/1944 | Benning | 414/32 |
| 3,190,434 | 6/1965 | Dardaine | 198/425 |
| 3,192,565 | 7/1965 | Rukavina | 414/30 |
| 3,351,388 | 11/1967 | Frank | 414/104 |
| 3,420,149 | 1/1969 | Middleditch et al. | 414/104 |
| 3,491,633 | 1/1970 | White | 414/105 |
| 4,343,575 | 8/1982 | Kimball | 406/19 |

FOREIGN PATENT DOCUMENTS

| 2538646 | 8/1975 | Fed. Rep. of Germany . |
| 1552615 | 1/1968 | France . |
| 367751 | 4/1963 | Switzerland | 198/462 |

Primary Examiner—Leslie J. Paperner
Assistant Examiner—Lyle Kim
Attorney, Agent, or Firm—Alexander J. McKillop; Michael G. Gilman; Charles J. Speciale

[57] ABSTRACT

An apparatus and a method for forming stacks of nested containers, such as cups and the like, and more particularly, an apparatus and method for isolating or separating stacks each consisting of a requisite count of isolated nested containers from a continuous supply of the containers.

20 Claims, 7 Drawing Figures

APPARATUS AND METHOD FOR FORMING STACKS OF NESTED CONTAINERS EACH HAVING A PREDETERMINED COUNT OF CONTAINERS

BACKGROUND OF THE INVENTION

1. Field of the Invention

The present invention relates to an apparatus and to a method for forming stacks of nested containers, such as cups and the like, and more particularly, relates to an apparatus and method for separating stacks each consisting of a predetermined count of isolated nested containers from a continuous supply of the containers.

2. Discussion of the Prior Art

In the packaging of various articles, particularly in instances wherein a plurality of nested articles are adapted to be packaged in an overwrap for retail bulk sales, it is important that a correct count or quantity of the articles be contained in each package in order to avoid complaints by retailers or consumers which are occasioned by a short count of the articles in each package, or to prevent economic losses to the manufacturer resulting from an excess or imprecise count of the articles being included in each package. Frequently, articles of that type may consist of containers, for example, cups constituted of a thermoplastic material which is formed into the cup-shaped configurations in a continually operating thermoforming and trimming installation, and wherein the articles are nested to form a continuous supply stack. Thereafter, stacks each having a count of a predetermined number of such nested containers are isolated, removed from the continuous supply of containers and suitably bagged, for example, by being transported directly into a package. Generally, the isolation of stacks each having a predetermined quantity of containers therein from a continuous supply of nested containers is effected either manually or through devices measuring the length of the isolated stack, which frequently may lead to inaccuracies in the count of containers provided in each of the isolated stacks. Consequently, it is of considerable economic and commercial importance to be able to provide an apparatus and a method wherein a predetermined count of nested containers, such as thermoformed plastic cups or the like, can be isolated or separated in a nested, stacked condition from a continuous supply of the containers, and the thusly separated stacks are continuously conveyed either directly or indirectly from the apparatus suitable packaging adapted for retail merchandising.

SUMMARY OF THE INVENTION

Accordingly, the present invention provides for an apparatus wherein stacks of nested containers, each consisting of a predetermined count of containers, and which are received in sequence from a continuous supply of the containers includes a pneumatically-operated feed conduit for conducting the containers towards a first station in the apparatus wherein the containers are nested so as to form a continuous nested container stack. The nested containers are then conveyed through suitable advancing means towards a second station in the apparatus wherein a plurality of rotating resilient elements contact the edge of each of the containers to advance these forwardly at a fixed count rate and predetermined nested relationship relative to each other. A conveyor drive which is adapted to operatively coact with the resilient elements, may consist of an endless chain each complete rotational operating cycle of the conveyor, is adapted to engage an end of one of the containers which has been advanced by the rotating resilient elements, and wherein the projecting member has a linear speed which is higher than the advancing feed rate imparted to the nested containers by the rotating resilient elements so as to thereby separate or isolate successive stacks of containers each having a predetermined count of containers in dependence upon the quantity of containers advanced by the rotating resilient elements during the time interval before the projecting member engages a container for each revolution or operating cycle of the chain conveyor. The separated stacks towards a suitable arrangement, such as a turntable, and from there conveyed to a suitable bagging arrangement for wrapping each stack in a package adapted for retail merchandising.

In order to change the quantity or count of containers in each separated stack, it is only necessary to vary the timing relationship between the rotational speed of the resilient members contacting each of the containers and the linear speed of the coacting chain conveyor drive.

Accordingly, it is a primary object of the present invention to provide an apparatus for isolating or separating stacks each consisting of a predetermined count of nested containers obtained from a continuous supply of the containers.

It is a more specific object of the present invention to provide an apparatus of the type described wherein stacks each consisting of a predetermined count of nested containers, such as thermoformed plastic cups, are continuously isolated from a continuous supply of the containers and adapted to be conveyed towards a suitable arrangement for wrapping each of the container stacks.

Still another object of the present invention resides in the provision of apparatus of the type described in which a continuous supply of containers is received from a container thermoforming installation, and advanced at a predetermined feed rate and nested condition, and wherein the apparatus includes structure and operative devices for continuously isolating or separating stacks of the nested containers with each stack having a requisite count of the containers so as to thereby result in a highly accurate and automatically operating container counting and stack forming system.

A further object of the present invention is to provide an apparatus of the type described wherein cooperative components of the apparatus are adapted to advance nested containers in a continuous sequence and predetermined relationship and in which cooperating structure of the apparatus engages the nested containers in synchronously timed sequence so as to isolate or separate the continuous stack of nested containers into separate stacks each containing a predetermined count of the nested containers, and to advance such separated container stacks to a further arrangement for packaging or the like.

A still further object of the present invention resides in the provision of a method for isolating or separating stacks each containing a predetermined count of nested containers from a continuous supply of containers through utilization of the apparatus as described hereinabove.

BRIEF DESCRIPTION OF THE DRAWINGS

Reference may now be had to the following detailed description illustrative of a preferred embodiment of an apparatus for the isolation or separation of stacks of nested containers wherein each stack incorporates a requisite count of the containers, taken in conjunction with the accompanying drawings; in which.

DETAILED DESCRIPTION

Figure 1:
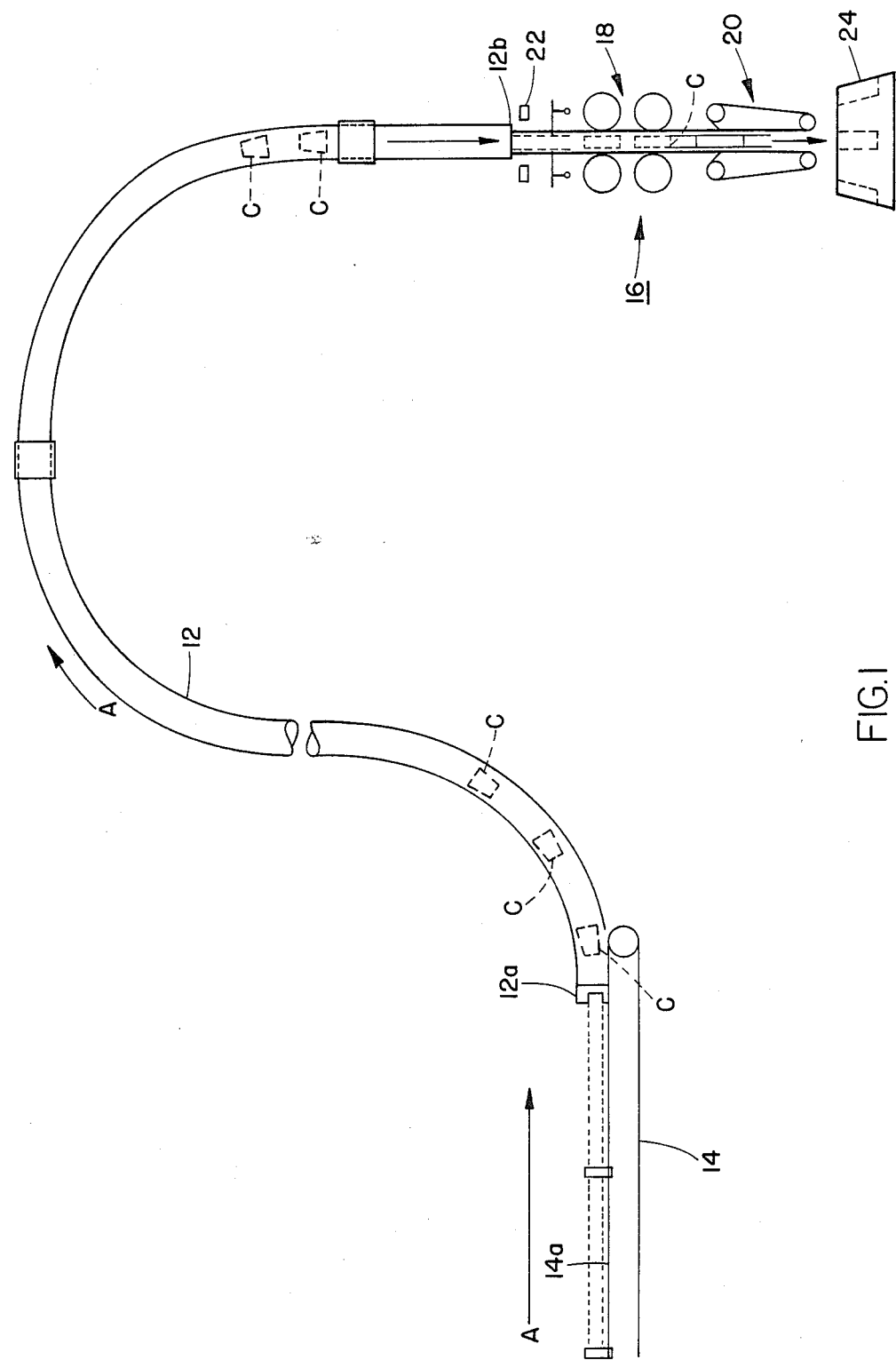
FIG. 1 illustrates a generally diagrammatic view of an apparatus for separating a continuous flow or supply of containers into separate stacks of nested containers, with each stack having a predetermined count of containers therein.

Referring now in specific detail to the drawings, and particularly FIG. 1, the apparatus for the separating or isolating of a continuous flow or supply of containers into separate stacks of nested containers includes a generally tubular conduit 12 which is adapted to be supplied with a continuous flow of containers from a suitable conveyor 14. The conveyor 14 may, if desired, have an upper run having a V-shaped cross section and which is movable in the direction towards the infeed end 12a of the conduit 12 for feeding containers C from a trim press of a thermoforming apparatus (not shown) in which the containers have been produced from thermoformable plastic material through a thermoforming process, in a manner well known in the technology. In this particular instance, the containers may be cups of thermoformable thermoplastic material, which have been molded in a thermoformer, separated into individual cups and trimmed in the trim press and then positioned on the upper run 14a of the conveyor 14 so as to be conducted towards the infeed end 12a of the conduit 12.

The conduit 12 has the containers C blown therethrough in the direction of arrow A through the utilization of a suitable pneumatic blowing device, such as a pneumatic jet pump (not shown), so as to cause the containers within the conduit 12 to be propelled in sequential order to continually flow towards the upper end or inlet of a container feed rate counting and separating apparatus 16 in conformance with the inventive concept as described hereinbelow.

The inventive apparatus 16 which provides for the continuous flow of containers or cups C received from the conduit 12 to be isolated or separated into discrete stacks of nested containers each having a requisite count of containers therein, includes a first station 18 from which the containers are advanced in a continual and nested manner to a second station 20 located vertically below the first station, and in which the containers are isolated into the separate stacks each having a requisite container count as described herein.

Appropriate operation of each of the functional components of the apparatus 16 is ensured through sensing the presence of an adequate supply of the containers at the first station 18 from the conduit 12. In this instance, for example, the presence of the containers C is detected through the positioning of a suitable detector device 22 above the station 18 below the discharge end 12b of the conduit 12. The container detector device 22 may consist of suitable photoelectric cells detecting the presence of the supply of containers being advanced towards the first station 18.

Positioned beneath the lower or discharge end of the apparatus 16 which, in essence, provides for the discharge of the isolated or separated stacks of the containers from the second station 20, may be a suitable turntable unit 24 adapted to receive the sequentially fed separated stacks of containers, and to advance these stacks towards a packaging arrangement (not shown) for packaging each of the stacks in a suitable overwrap film material, as is well known in the packaging art.

Figure 2:
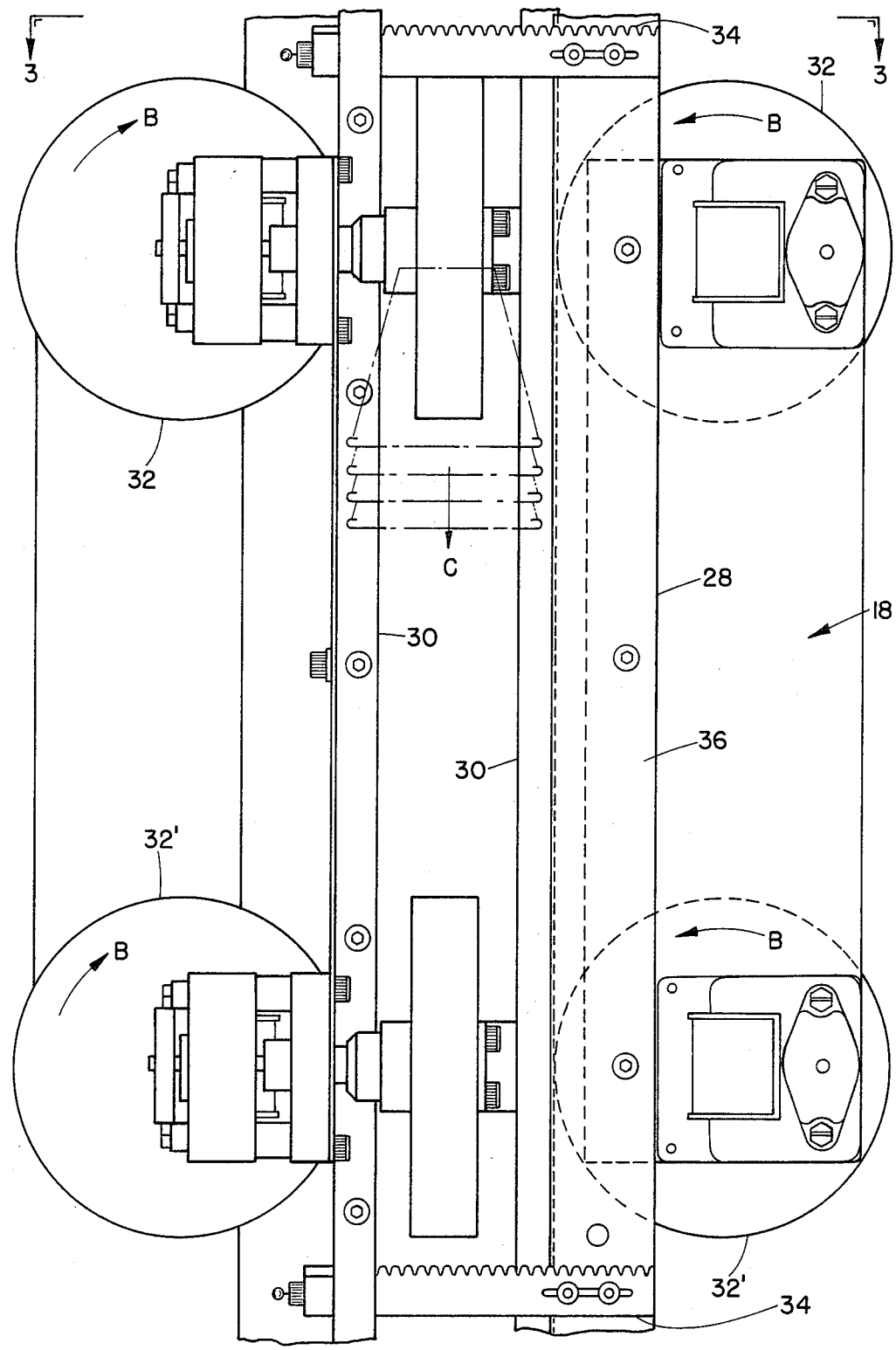
FIG. 2 is an elevational view of a first portion of the apparatus of FIG. 1 for continually advancing the supply flow of containers into a nested, stacked relationship.
Figure 3:
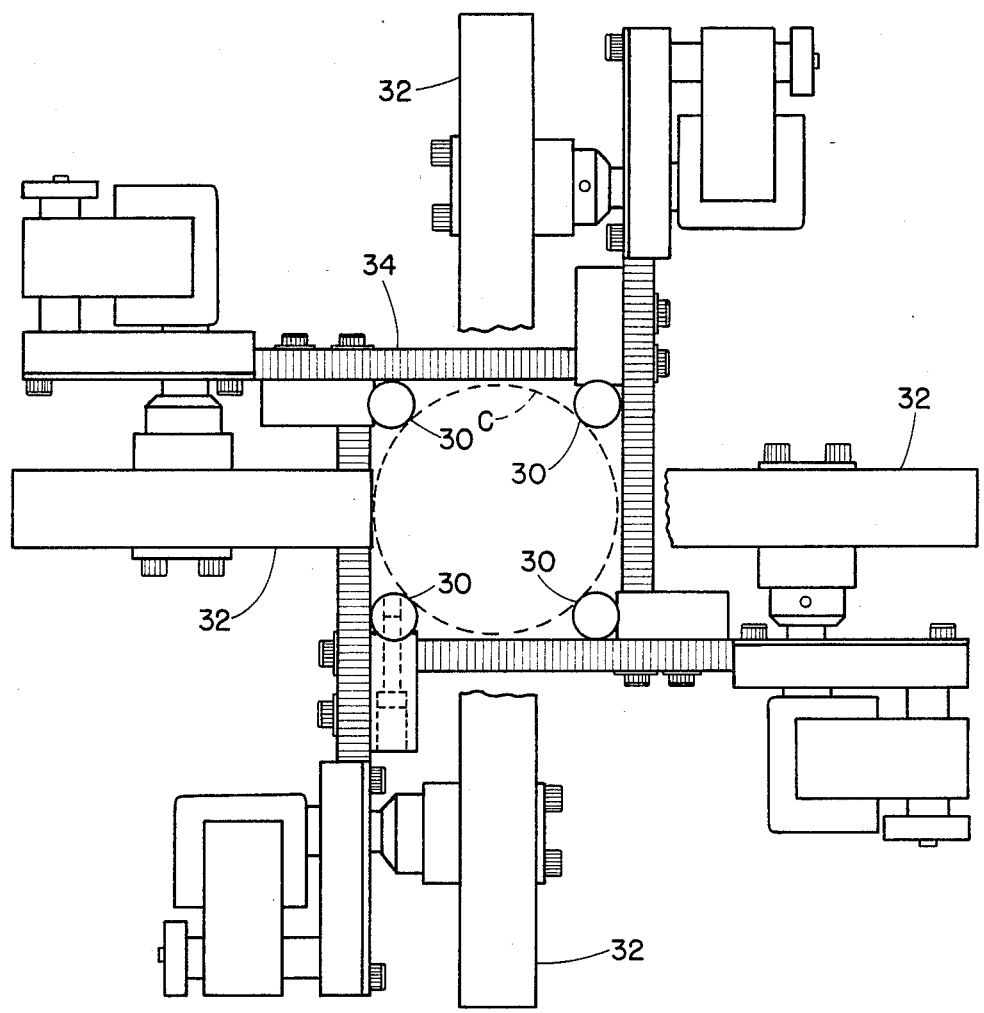
FIG. 3 is a top plan view of the apparatus taken along line 3—3 in FIG. 2.
Figure 4:
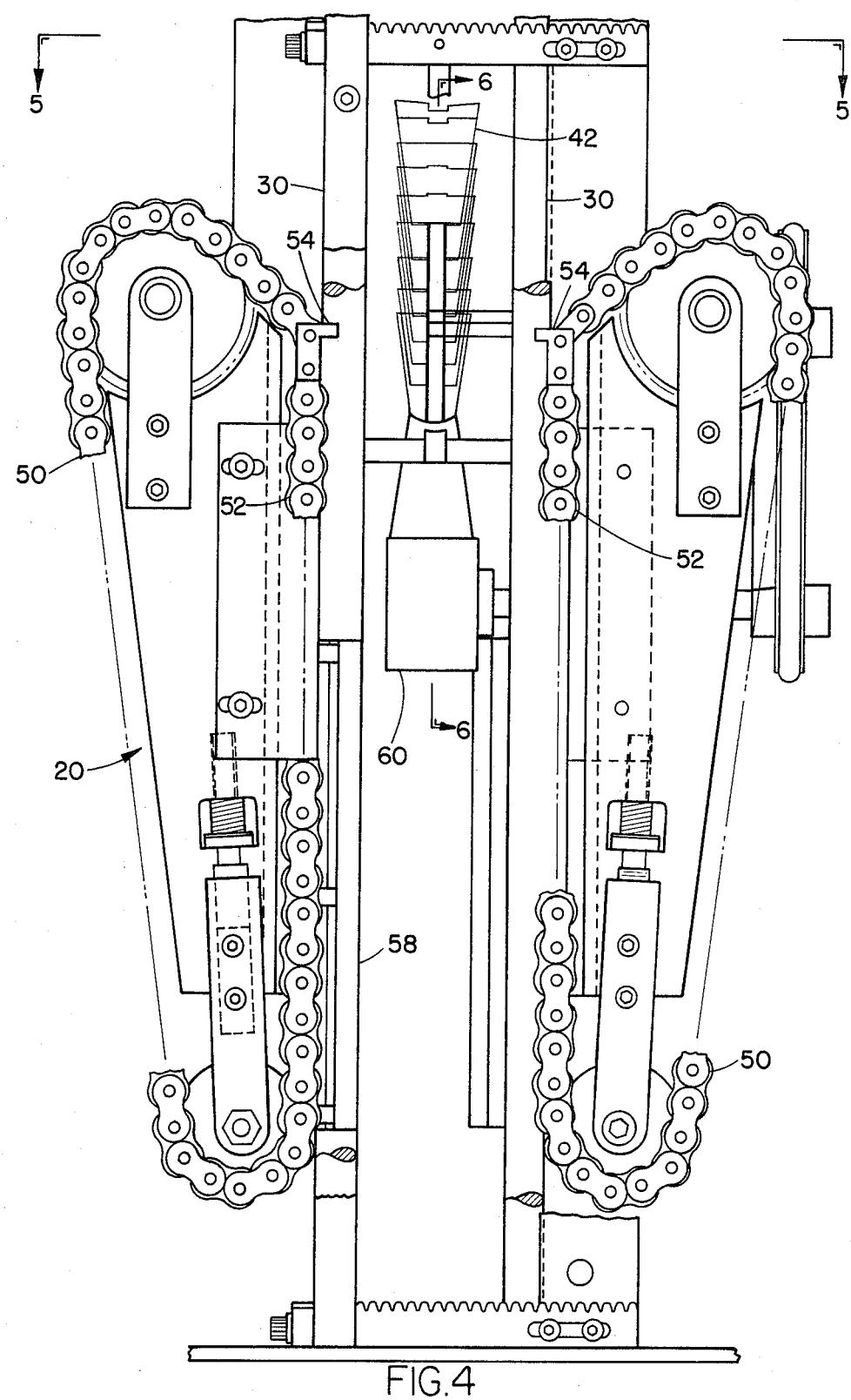
FIG. 4 is elevational view of a second portion of the apparatus illustrating the container count arrangement and structure for advancing isolated or separated stacks of nested containers, each having a requisite container count.
Figure 5:
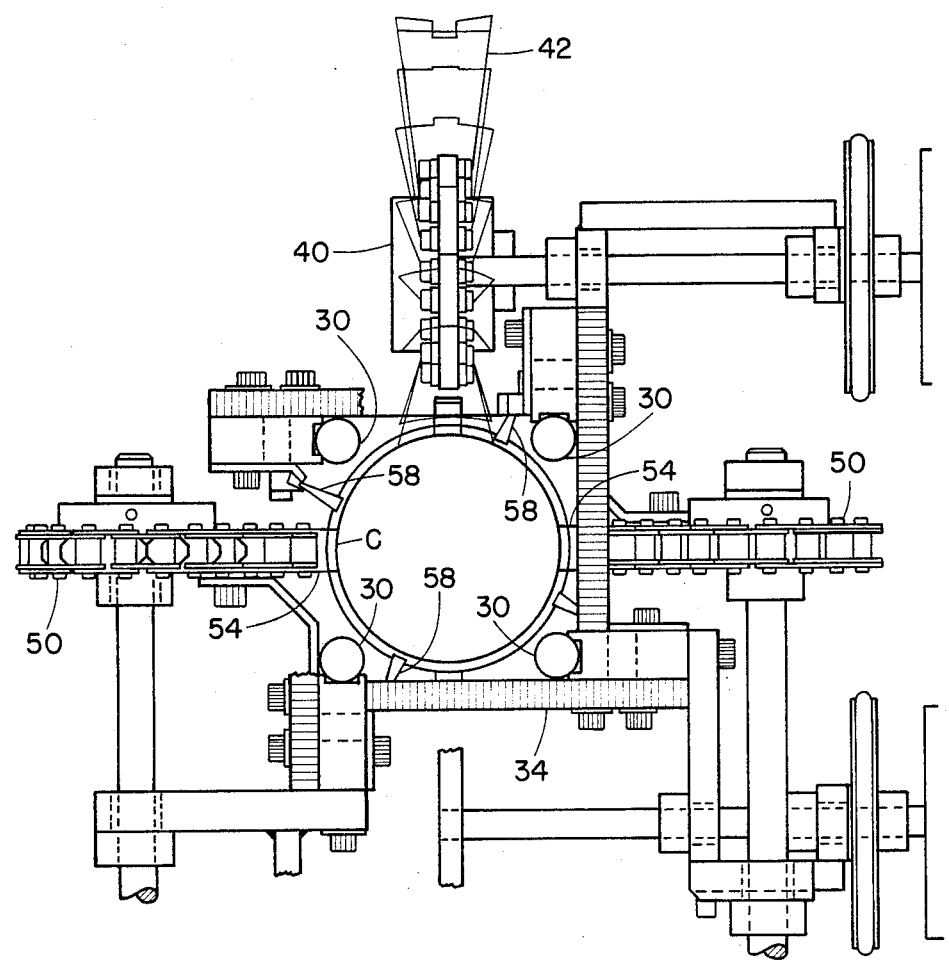
FIG. 5 is a transverse sectional view taken along line 5—5 in FIG. 4.
Figure 7:
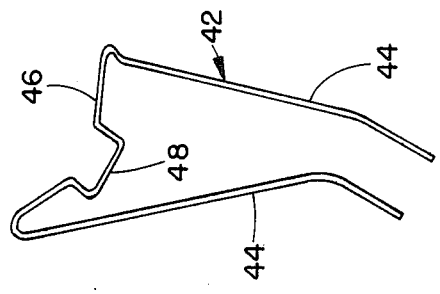
FIG. 7 is a detailed frontal view of one of the resilient members for advancing the nested containers shown in FIGS. 4 through 6.
Figure 6:
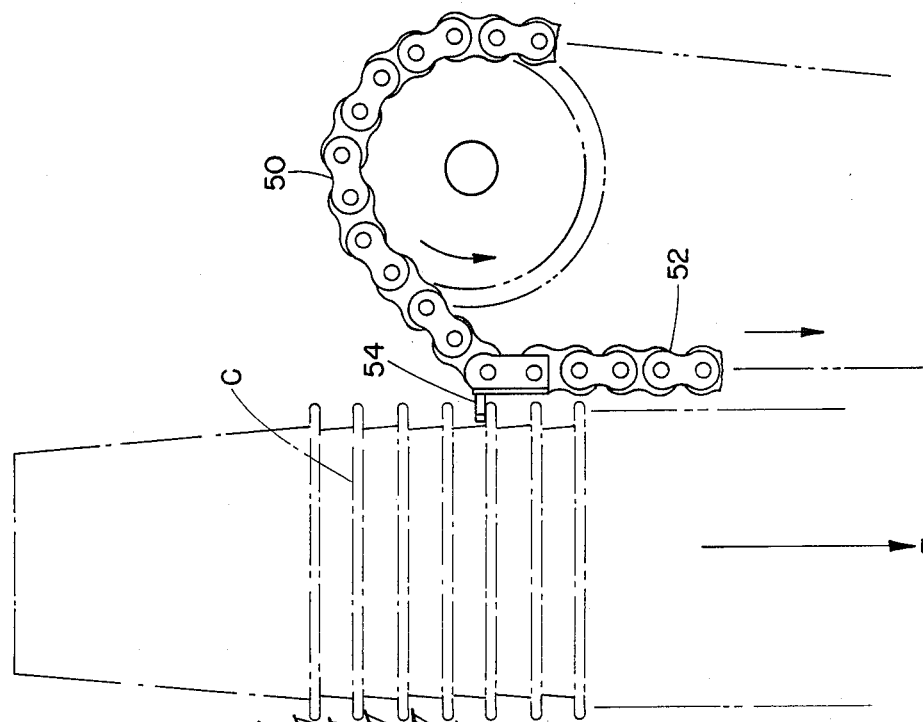
FIG. 6 is a generally diagrammatic side elevational view taken in the direction of arrow 6 in FIG. 4.

Referring now to the structure of the apparatus as illustrated in FIGS. 2 and 3 of the drawings, the first station 18 of the apparatus 16 which is adapted to receive the supply of containers from the conduit 12 includes a generally vertically extending frame structure 28 incorporating vertical, parallel spaced guides 30, in this instance four rods each contacting the outer surface of the containers at circumferentially spaced locations thereabout so as to maintain the containers in vertically oriented positions during their downward travel through the apparatus.

Arranged intermediate each of the guide rods 30 are wheels 32 rotating in the direction of arrow B, which may have a bristle-like circumferential surface positioned to come into frictional contact with the outer surfaces of the containers being conveyed downwardly towards first station 18 from the conduit 12, and to thereby continually impart downward pressure to the containers in the direction of arrow C between the guide rods 30.

Positioned vertically below the first set of rotating wheels 32 are a second similar set of wheels 32' which are driven at the same speed as wheels 32 in order to continue advancing the containers downwardly toward the second station 20 into a nested condition.

The entire frame structure 28 may be mounted on vertically and horizontally adjustable rack members 34 and 36 to allow for adjustment of the positioning of wheels 32 and 32', and of the spacing between the guide rods 30 to accommodate for the conveyance of containers of different sizes through the apparatus 16.

The operation of the apparatus is ensured through the detector or photoelectic cell arrangement 22 continually detecting the presence of containers C from the conduit 12, thereby ensuring that a supply of containers will be available from the first station 18 of the apparatus 16.

As mentioned hereinabove, from the first station 18 of the apparatus 16 the containers are then advanced in a nested condition between the guide rods 30 vertically downwardly towards the second station 20 of the apparatus through the action of wheels 32, 32', and wherein the containers are adapted to be isolated or separated into discrete stacks of nested containers, with each stack being constituted of a requisite count of containers.

The second station 20 of the apparatus providing for the requisite count of containers and advancing separated or isolated stacks of nested containers includes rotatable wheels 40 arranged adjacent the path of travel of the containers between the vertical guide rods 30, such wheels preferably being arranged spaced 180° apart on the opposite sides of the advancing containers C.

Each wheel 40 includes a plurality of resilient members 42 mounted in spaced relationship about the circumference thereof and each projecting radially towards the containers C. Each of the resilient members, which may be formed of steel wire, includes a pair of radially outwardly diverging side arm portions 44 interconnected by a transverse member 46 having a laterally offset central portion 48. During rotation of the wheels 40, each of the resilient members 42 is adapted to have the transverse portion 46 contact the rim of a container so as to bias it forwardly into a predetermined nested relationship with a preceding container advanced downwardly through the second station 20 of the apparatus 16. Consequently, the continuous rotation of the wheel 40 and the continual contacting of successive containers C by the resilient members 42 will produce a predetermined feed or count rate of containers in nested relationships at a fixed distance with respect to each of the preceding containers.

Endless conveyor chain drives 50 are arranged intermediate and exteriorly of the guide rods 30, preferably offset 90° relative to the wheels 40 about the circumference of the containers, and are driven in synchronism with the rotation of wheels 40 through the intermediary of a suitable drive arrangement (not shown) and in which a vertical run 52 of each of the conveyor drives 50 extends into close proximity with and follows the linear path of downward travel of the containers C as they are advanced through the second station 20 by the action of the resilient members 42.

Each of the endless conveyor chains 50 includes a clip 54 mounted thereon to be in alignment with each other during travel of the conveyors, and projects inwardly towards the containers C when rotated in the direction of arrow E at the upper end of the conveyor travel and when moved downwardly along the run 52. The projecting clips 54 are adapted to engage the edge or rim portion of a container C at predetermined intervals, or, in essence, each time the endless conveyor chains 50 complete a revolution at which point its clip 54 has reached the upper end of the run 52. The linear downwardly moving speed of the run 52 is somewhat higher than the circumferential speed of the rotary wheels 40 or the downward feed rate of the container C by the resilient members 42 so that, depending upon the relative speeds between the conveyor runs 52 and the rotational speed of the wheels 40, a requisite count of containers C will be isolated or separated and pushed downwardly away from the subsequently advancing containers by the projecting clips 54 on the endless chains 50. Through suitable synchronization or correlation between the rotational speed of the wheels 40 and the linear speed of the endless conveyor chains 50 it is possible to predetermine the count or feed rate containers for each separated container stack advanced downwardly through the apparatus by the projecting clips 54.

In order to prevent the nested containers in each of the isolated or separated stacks of containers which are being advanced downwardly by the projecting clips 54 from separating or falling apart, suitable elongated brushes 58 are positioned to extend along the downward path of movement of the advancing containers, so as to be in frictional engagement with the outer surfaces thereof and to thereby maintain the downwardly moving stacks in their nested container positions.

If desired, the apparatus 16 may have the turntable 24 arranged therebelow for receiving the separated stacks of nested containers which have been isolated by means of the interacting chain conveyor drives 50 and the rotatable wheels and resilient members 40, 42, for transport to a suitable wrapping arrangement.

Although not illustrated in the drawings, the brush wheels 32, 32', the wheels 40 mounting the resilient members 42, and the endless chain conveyors 50 containing the projecting clips 54 may be driven or actuated from a common drive arrangement so as to provide for the appropriate synchronized speed relationships between each of the components and to thereby facilitate a requisite count of containers being provided in each stack which is isolated by the endless conveyor chain drives 50 in cooperation with the container count function of wheels 40 and resilient members 42. Furthermore, if desired, in order to change the count of containers in each isolated stack, it is also possible to contemplate varying the linear speed of the conveyor chain drives 50 relative to the rotational speed of the wheel 40. In effect, by reducing the linear speed of the conveyor chain drives 50 relative to the rotational speed of the wheel 40, it is possible to provide a higher count of containers in each separated stack and, conversely, by increasing the linear speed of the conveyors 50, although still maintaining a higher linear speed relative to the feed rate of the resilient members 42 on wheels 40 in order to effect container separation, it is possible to reduce the count of containers in each separated stack of containers.

In order to prevent or reduce possibly destructive vibrations in each of the resilient members 42 during the rotation of the wheel 40 and subsequent to each resilient element disengaging from contact with a container which it has previously contacted, a suitable free-running rubber wheel 60 may be arranged to be contacted by each of the resilient members 42 in order to attenuate vibration of the resilient elements and to thereby reduce possible fatigue failure of these components.

From the foregoing it thus appears that the invention provides an extremely dependable and automatic apparatus and method which is adapted to nest a plurality of containers and to advance these in a predetermined manner whereby the containers may be separated into isolated stacks each having a requisite count of containers therein.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for separating stacks each consisting of a predetermined count of nested containers from a supply of said containers; comprising:
   (a) means for feeding a continuous supply of containers to a first station; detector means at said station for determining the presence of said containers;
   (b) means for advancing a continuous flow of said containers in nested relationship from said first station to a second station;
   (c) means at said second station for sequentially stacking said nested containers at a predetermined rate while advancing said containers through said second station; and means operatively coacting with said stacking means for separating a requisite count of said nested containers into individual stacks and for conveying said separated stacks of containers from said apparatus, said container stacking means of said second station comprising at least one rotatable wheel, a plurality of resilient members spaced about and extending radially outwardly from said wheel, said resilient members being adapted to engage the edge of each said container so as to bias said container downwardly into predetermined nested relationship with a preceding container, said coacting means including a protuberance intermittently engaging the trailing edge of one said container of said nested containers at intermittent time intervals and at a downward speed of movement higher than the speed of rotation of said wheel to thereby separate and advance stacks each constituted of a predetermined count of said nested containers from said second station.

2. An apparatus as claimed in claim 1, wherein said container feeding means comprises a tubular infeed conduit; and pneumatic conveying means for sequentially transporting said containers through said conduit from a container supply source to said first station.

3. An apparatus as claimed in claim 1, said first station being located vertically above said second station; container guide means extending downwardly from a discharge end of said container feed means through said first and second stations, said guide means contacting the outer surface of said containers for guiding said nested containers downwardly through said apparatus.

4. An apparatus as claimed in claim 2, said means for advancing said containers from said first station towards said second station comprising at least one rotating brush wheel having an outer circumference contacting the outer surface of said containers for urging said containers towards said second station.

5. An apparatus as claimed in claim 4, comprising a plurality of said rotatable brushes arranged about said second station contacting said containers at a plurality of spaced locations about the circumference of said containers.

6. An apparatus as claimed in claim 5, comprising at least two sets of said brushes being linearly spaced along the path of conveyance of said containers intermediate said first and second stations.

7. An apparatus as claimed in claim 1, said resilient members each comprising a bent wire having an edge portion contacting the trailing edge of each said container to maintain a downward feed rate of containers.

8. An apparatus as claimed in claim 7, comprising a rotatable rubber wheel having an outer circumferential surface contactable by each of said resilient wires for attenuating vibration of said wires subsequent to each said wire contacting a respective container.

9. An apparatus as claimed in claim 1, said coacting means comprising an endless chain drive having a run extending downwardly from said second station, said protuberance being a projecting clip member mounted on said chain drive and extending towards said containers so as to contact the rim surface of one said container at predetermined intervals.

10. An apparatus as claimed in claim 9, comprising a plurality of said coacting means being spaced about said second station, and a plurality of said rotatable wheels having said resilient members thereon for concurrently contacting the rims of said containers at a plurality of circumferentially spaced locations.

11. An apparatus as claimed in claim 9, comprising elongate brush means extending in proximity with the run of said endless chain drive in frictional contact with the exterior surface of said containers along the downward path of travel of said containers so as to maintain the nested condition of the containers in said separated stacks.

12. An apparatus as claimed in claim 1, comprising drive means for rotating said rotatable wheel and resilient embers to advance said containers at a predetermined speed relative to the speed of said coacting means so as to cause said protuberance to form separate stacks of a requisite count of said containers during each passage of said protuberance along said run.

13. An apparatus as claimed in claim 12, said drive means actuating the advancing means at said first station in synchronism with the rotation of said resilient members and coacting members and coacting means for controlling the container count and advance at said second station.

14. An apparatus as claimed in claim 1, comprising turntable means at the discharge end of said arrangement for receiving said separated stacks of said containers from said second station.

15. An apparatus as claimed in claim 1, said detector means for detecting the presence of containers at said first station comprising a photoelectic cell.

16. An apparatus as claimed in claim 1, wherein said containers consist of cups, said cups being conveyed through said apparatus.

17. A method for counting and separating stacks of a predetermined number of nested containers from a continuous supply of said containers; comprising the steps of:
   (a) feeding a continuous supply of containers in nested relationship to a first station, and determining the presence of said containers at said first station;
   (b) advancing a continuous supply of said nested containers from said first station to a second station;
   (c) sequentially stacking said nested containers while advancing said containers through said second station by at least one rotatable wheel having resilient members spaced about and extending radially outwardly from said wheel and being adapted to engage the edge of each said container so as to bias said container downwardly into predetermined nested relationship with a preceding container, the edge of one said container of said nested containers being engaged by a downwardly moving element at intermittent time intervals at a downward speed higher than the speed of rotation of said wheel to thereby separate and advance stacks each consisting of a predetermined count of said nested containers from said second station; and separating a predetermined count of said nested stacked containers into individual separated stacks, and conducting said separated stacks of containers from said apparatus.

18. A method as claimed in claim 17, comprising pneumatically blowing said containers through a conduit from a supply source to said first station.

19. A method as claimed in claim 17, said first station being vertically spaced above said second station; comprising guiding said containers from the discharge end of said conduit through said first and second stations for nesting said containers.

20. A method as claimed in claim 17, comprising advancing said containers from said first station towards said second station by rotatable means having its circumference contacting the exterior surface of said containers urging said containers towards said second station.

* * * * *